United States Patent [19]

Cameron

[11] 3,762,730
[45] Oct. 2, 1973

[54] HYDRAULICALLY ACTUATED SPLINE ARBOR AND CHUCK CONSTRUCTION

[76] Inventor: Gordon N. Cameron, 1072 N. Brys, Grosse Pointe Woods, Mich. 48236

[22] Filed: Mar. 9, 1972

[21] Appl. No.: 233,025

[52] U.S. Cl. .......................... 279/4, 279/1 G, 279/2, 242/72 B
[51] Int. Cl. ...................... B23b 31/30, B23b 31/40
[58] Field of Search ........................... 279/2, 4, 1 G; 242/72 B; 82/44; 269/48.1

[56] References Cited
UNITED STATES PATENTS
2,960,342  11/1960  Raper .............................. 82/44 X
FOREIGN PATENTS OR APPLICATIONS
736,057  8/1955  Great Britain ..................... 279/1 G Primary Examiner—Francis S. Husar
Attorney—Lloyd M. Foster et al.

[57] ABSTRACT

Hydraulically actuated spline arbor and chuck devices having a novel configuration for the spline teeth to produce axially spaced straightening engagement and accurate centering of a splined part engaged by the arbor or chuck. The hydraulic actuation includes novel sealing means allowing a significant increase in the maximum hydraulic pressure obtainable and maximum permissible expansion of the spline without leakage as compared to prior seals rendering practical the relatively greater expansion for registration on pitch diameter or side teeth than in the case of cylindrical configurations. The invention is applicable to a variety of spline configurations including involute and square splines.

16 Claims, 12 Drawing Figures

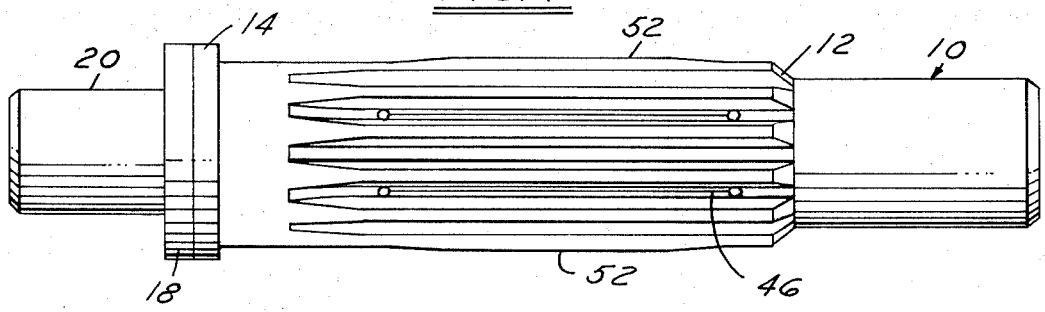
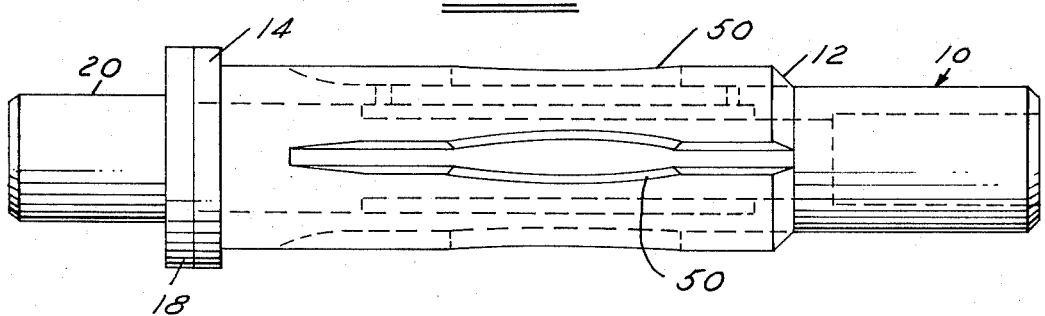
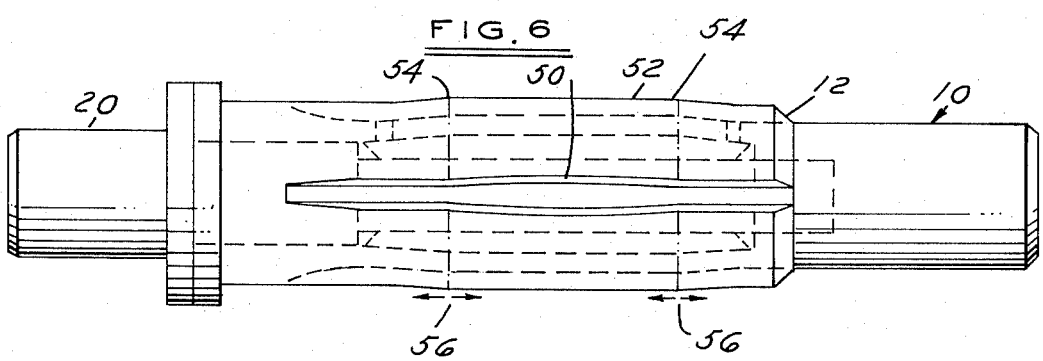
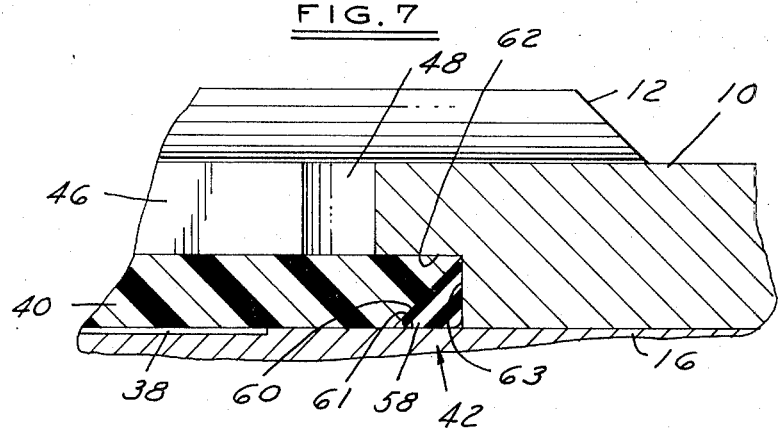

HYDRAULICALLY ACTUATED SPLINE ARBOR AND CHUCK CONSTRUCTION

BACKGROUND OF THE INVENTION

Splined shafts, gears and other parts often must be accurately held for gauging or manufacturing operations related to the spline. The spline must be held concentrically and rigidly. Hydraulically actuated arbors and chucks such as those disclosed in U.S. Pat. No. 3,202,432 will frictionally grip only the radial extremities of the spline teeth. However, involute splines and square splines often engage and locate complementary parts by pitch diameter or other tooth side engagement. Therefore, for best accuracy, a manufacturing or gauging arbor or chuck should engage the spline tooth sides of a part at the same position as the complementary mating part.

SUMMARY OF THE INVENTION

The invention comprises hydraulically actuated spline arbor and chuck constructions which include axially spaced straightening engagement and accurate centering as well as novel sealing means to accommodate the higher hydraulic pressure required for the relatively large range of expansion and the thick section of the expansion members utilized in the construction of an expandable or contractable spline. The teeth are hollow ground to provide axially spaced initial contact locations with a splined part for predetermined concentricity with respect to the arbor or chuck. The hydraulic actuating means disclosed in U.S. Pat. 3,202,432 is not entirely suitable for creating the maximum hydraulic forces and deflections necessary in the spline arbor and chuck constructions disclosed herein; and, the present invention provides improvements to that particular hydraulic construction to accommodate higher pressures and deflections. The present invention in some cases may be utilized on arbors and chucks having different hydraulic circuits and actuating means.

DESCRIPTION OF THE DRAWINGS

FIG. 4 is a side view of the spline arbor over expanded after final grind;

FIG. 5 is a side view of the arbor in fully relaxed condition;

FIG. 6 is the arbor expanded to workpiece holding size;

FIG. 7 is an enlarged fragmentary section of FIG. 2 showing the sealing means;

DESCRIPTION OF THE PREFERRED EMBODIMENT

Figure 2:
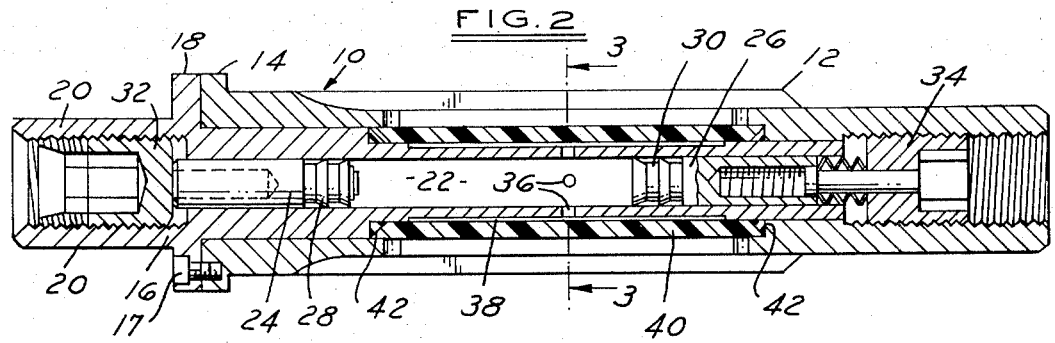
FIG. 2 is a longitudinal section of the spline arbor.
Figure 1:
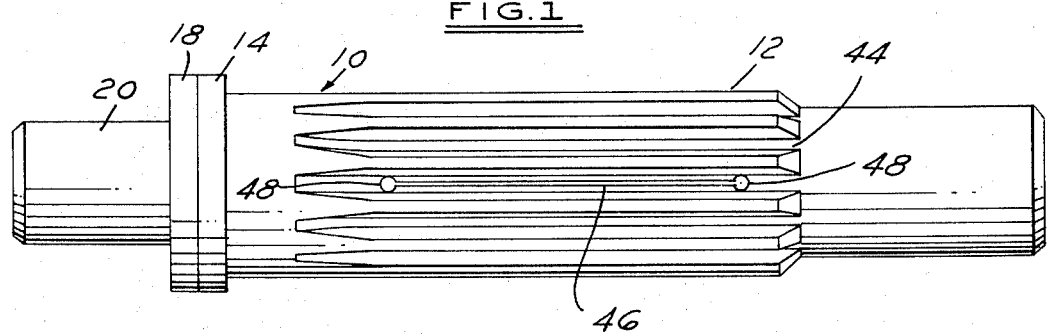
FIG. 1 is a side view of an involute spline arbor including the present invention.
Figure 3:
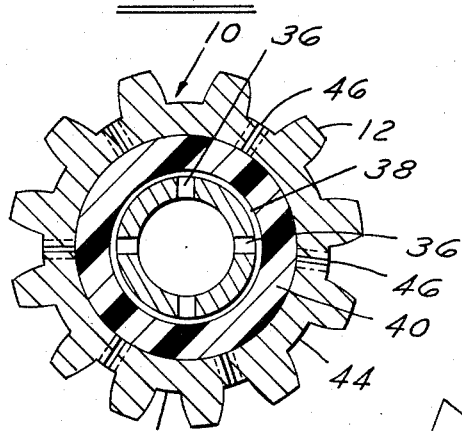
FIG. 3 is an enlarged cross section taken along the line 3—3 of FIG. 2.

Referring to FIGS. 1, 2 and 3, the arbor comprises an external body portion 10 having splines 12 integrally formed thereon. The body 10 includes a flange 14 for the retention of the closely fitting concentric inner member 16 which includes a complementary flange 18. Threaded screws 17 connect the flanges 14 and 18. The inner member 16 includes a cylindrical extension 20 for engagement with any suitable arbor support (not shown). The inner member 16 also contains a cylinder hydraulic chamber 22. At each end of the cylinder chamber 22 are piston assemblies 24 and 26 having rubber lip seals 28 and 30 and threaded piston actuating means 32 and 34 which engages respectively the inner member 16 and body 10. Cylinder chamber 22 communicates through passages 36 to a concentric annular chamber 38 formed on the outer surface of the inner member 16. Enclosing the annular chamber 38 is an expansible plastic sleeve 40 made of a suitable strong material such as nylon and having annular sealing means 42 at each end. A plurality of the spline roots 44 include slits 46 having terminal enlarged holes 48. Slits 46 may be provided in all of the roots 44 or less than all as shown depending upon the overall size of the arbor, the range of expansion and the thickness of the body 10 below the roots 44. In the particular involute spline shown the slits 46 are located in alternate roots. Expansion and contraction of the spline is accomplished by actuating the threaded means 34 which in turn moves the piston assembly 26 to force hydraulic fluid into the annular chamber 38. The operation and adjustment of the hydraulic actuation produced by the assembly generally contained within the inner member 16 is similar to that disclosed in U.S. Pat. 3,202,432 noted above.

In FIGS. 4, 5 and 6, the involute spline arbor is shown rotated one full tooth from the position shown in FIG. 1 and greatly exaggerating the relief configuration of the teeth after final grind. In manufacturing the arbor, the spline teeth are cut and ground in a conventional manner to the final accuracy desired for the spline and the slots 46 are next cut. The arbor is then completely assembled, filled with hydraulic fluid, and actuated to expand the spline until the spline diameter is oversize by about twice the maximum part tolerance to be expected in use. The final grind for the spline will then be repeated over a portion of the teeth extending about three-fourths of the length of the slots 46. This portion of the spline is denoted by 50 in FIG. 5 where the arbor is in completely relaxed condition and the ground relief portion is exaggerated.

The portion of the spline located between the slits tends to move radially as a flat plate under expansion. As a result the grinding is most concentrated on the sides of the teeth adjacent roots that do not have slits, as shown in FIGS. 4 thru 6 since relatively little circumferential expansion takes place adjacent unslotted roots. Under the double expansion shown in FIG. 4 and after the final hollow grind, the spline will appear almost exactly the same as the relaxed spline before hollow grinding since the wheel used for the hollow grind is the same as the final grind wheel used to complete the previous conventional spline manufacturing steps. Under the double expansion however, the spline is as shown with the expansion exaggerated at 52 in FIG. 4.

Typically, the expansion is on the order of 0.020 of an inch for a nominal one inch diameter arbor.

The arbor completely relaxed as shown in FIG. 5 indicates clearly the result of the hollow grind. The sides of the spline adjacent roots having slits 46 receive little or no hollow grinding since the circumferential expansion of the spline takes place substantially between teeth having slits therebetween. In the case of a spline having slits in all roots the adjacent sides will be hollow ground on all teeth to provide a similar effect as above since the circumferential expansion of the spline will be evenly distributed.

FIG. 6 indicates the arbor expanded to maximum part tolerance. In FIGS. 5 and 6, most of the spline teeth have been deleted for clarity. It can be seen in FIG. 6 that the hollow ground portion as shown exaggerated tends to straighten since the portions of the spline between the slits tend to flatten under hydraulic pressure. When a spline part or work piece is mounted upon the arbor and the arbor hydraulically actuated to expand the spline, the arbor spline will first engage the work piece spline circumferentially about the arbor spline at the points indicated by 54, i.e., the limits of the hollow grind. Further engagement by the arbor spline of the work piece spline (not shown) will take place as indicated by the arrows 56. The work piece will thereby be prevented from cocking axially with respect to the arbor axis, because it is concentrically engaged evenly at two axially separated annular positions.

A hollow grind about three-fourths the length of the slits has been found most effective; however, the hollow grind may vary with operative results from about one-fourth to substantially the entire length of the slits. The axial length of the work piece spline to be accommodated on the arbor will generally determine the preferable length for the hollow grind. The arbor diameters have been found suitable over a range of nominal spline diameters of 7/16 to 24 inches with a ⅛ to ⅜ inch thickness for the stock at the root of the spline.

In order to obtain the internal hydraulic pressure necessary to expand the spline without leakage of fluid a special configuration for the sealing means 42 is provided as shown in FIG. 7. The sealing means 42 comprises and O-ring seal 58 squeezed into an annular cavity having a triangular cross section formed by the 45° bevel surface 60 formed on the end of the plastic sleeve 40 and the perpendicular surfaces 61 and 63 of the inner member 16 and body 10. This configuration differs from the prior art such as that shown in U.S. Pat. No. 3,202,432 where the O-ring seal is squeezed into an annular chamber substantially square in cross section. The new sealing means 42 operates by utilizing the increasing hydraulic pressure in the chamber 38 to progressively tighten the bevel surface 60 of the plastic member 40 against the O-ring 58. As the member 40 expands outwardly about the chamber 38, thereby expanding the spline 12, the portion adjacent bevel surface 60 tends to deflect down tightly against the O-ring 58. The sleeve 40 is prevented from expanding outwardly by the annular surface 62 of the arbor body 10 beyond the ends 48 of the slots 46. Thus, with the surface 62 operating as an annular fulcrum the beveled edge 60 tends to pivot inwardly against the O-ring 58 as the member 40 expands under hydraulic pressure in the chamber 38. Since the axial length of the sleeve 40 about the chamber 38 is much greater than the sleeve axial length adjacent the annular surface 62 a leveraging action occurs with a potential sealing pressure several times the fluid pressure in the chamber 38. The bevel surface 60 may range about 30° to 60° from the axis although 45° is preferred. The new sealing configuration has been found to allow a tripled expansion range without leakage of fluid in comparison to the prior square configuration.

Figure 8:
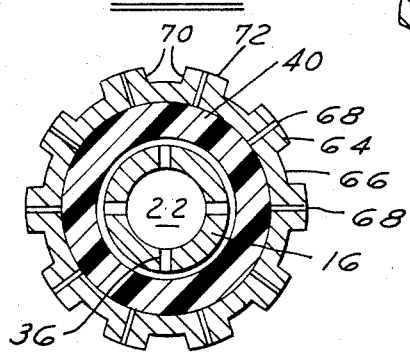
FIG. 8 is a cross section of a square tooth spline arbor otherwise similar to the arbor of FIG. 1.
Figure 9:
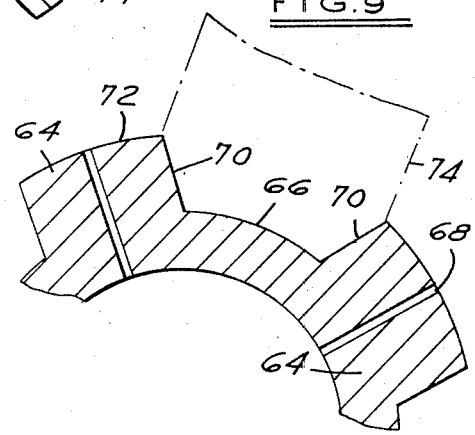
FIG. 9 is an enlarged partial cutaway section of FIG. 8.

FIG. 8 is a cross section of a square tooth spline arbor similar in all other respects to the arbor shown in FIGS. 1 and 2. The section of FIG. 8 is taken along a line similar to the line 3—3 of FIG. 2. The body of the square spline arbor has square spline teeth 64 separated by roots 66; however, the slits 68 are located in the teeth 64 rather than the roots 66. In the case of a straight spline such as in FIG. 8, the teeth may be designed to engage on the sides 70 or the tops 72, i.e., the major diameter of the teeth. Where every tooth 64 has a slit 68 the arbor is expanded as above for the involute spline and each side 70 and root 66 is hollow ground for a square spline workpiece which will engage with the sides of the teeth. The position of the grinding wheel is shown in dotted outline 74 in FIG. 9. Alternatively, where the major diameter of the square spline arbor is to engage the root of the complementary work piece spline the outer tooth surface 72 adjacent each side of the slit 68 is hollow ground using the conventional grinding wheel which ground the major diameter originally. In the case of a square spline arbor having slits in less than all of the teeth the teeth having slits will be hollow ground on the major diameter since their expansion is most pronounced. The teeth not having slits will not be ground or will receive a nominal grind in comparison to the teeth with slits. Similarly, where the engagement is to be with the tooth sides, the teeth having the slits will require the hollow grind with little or no hollow grind performed on the teeth having no slits. This follows from the fact that the teeth having the slits will expand radially and open up circumferentially more than the teeth not having slits since each solid piece between slits will tend to move radially as a flat plate under the hydraulic expansion. The length of the hollow grind will again be generally three-fourths of the length of the slits; however, this may be varied as necessary for the longitudinal length of the complementary work piece spline.

Figure 10:
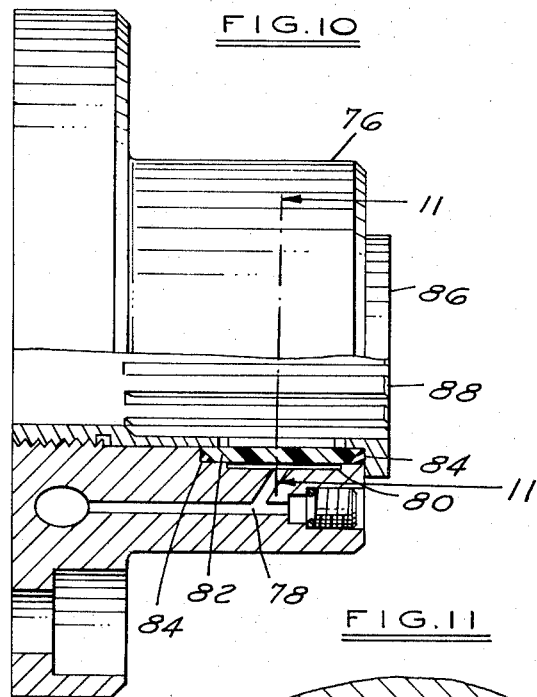
FIG. 10 is a partially sectioned side view of a splined chuck.
Figure 11:
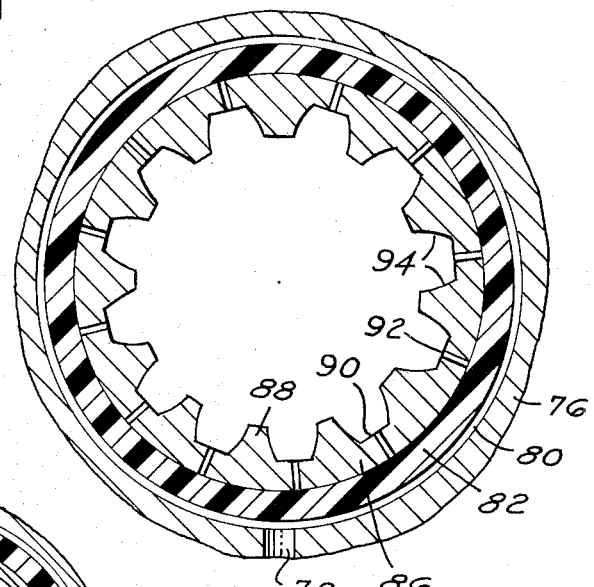
FIG. 11 is a cross section of the chuck of FIG. 10 showing an involute spline; and, FIG. 12 is a cross section of a chuck similar to FIG. 10 but incorporating a square spline.
Figure 12:
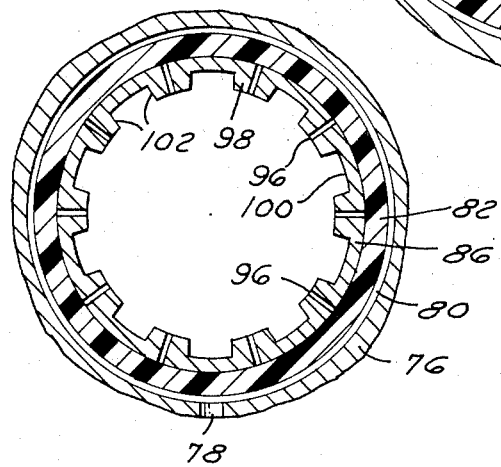

In FIG. 10 a spline chuck is shown having an involute spline as shown in FIG. 11, which may be modified to provide a square spline as shown in FIG. 12. The hydraulic actuating means shown is the same as that disclosed in U.S. Pat. No. 3,202,432 and may alternatively be any other suitable means for providing the even inward expansion necessary to actuate the spline. In FIG. 10 the chuck body 76 contains hydraulic passages 78 communicating with an annular chamber 80 which surrounds a flexible sleeve 82 having annular sealing means 84 similar to the novel sealing means disclosed in FIG. 7. The inner member 86 has spline teeth 88 integrally formed thereon. In FIG. 11 each root 90 of the spline includes a slit 92 similar to those disclosed above. The sides 94 of the involute spline teeth adjacent the roots 90 and slits 92 will be hollow ground under substantially double hydraulic actuation as determined by the work piece maximum tolerance about three-fourths the length of the slits or as desired based on work piece longitudinal length as with the spline arbor. Where all of the roots 90 have slits 92 all of the involute teeth sides 94 will be equally hollow ground, however, where less than all of the roots 90 have slits 92 the sides 94 adjacent slits 92 will be hollow ground with the sides adjacent non-slotted roots receiving no grind or a nominal grind. This is because the distance between the sides adjacent the slit will be subjected to the greatest circumferential contraction and will engage the work piece initially upon actuation.

In FIG. 12 the slits 96 are located in square spline teeth 98. For a preferred engagement with the major diameter of a complementary work piece spline the roots 100 will be hollow ground whereas for a preferred side wall and tip engagement, the sides 102 and tips 104 will be hollow ground.

Basically, the tooth surfaces receiving the hollow grind will be surfaces of preferred engagement as determined by work piece design factors. From a practical manufacturing standpoint the proper hollow grind can be most effectively obtained by a regrind of the preferred engagement surfaces over the 3/4 length with the same grinding wheel and set up used to finish the spline prior to assembly and actuation. The spline is actuated to about double the maximum tolerance limit of the work piece and returned to the grinding set up.

I claim:

1. A spline holder comprising a body having a spline formed thereon, actuation means to change the effective radius of the spline, and characterized by relieved surfaces on portions of the spline initially engageable with complementary spline portions of a work piece upon actuation of the means to change the effective radius.

2. The holder of claim 1 wherein the relieved surfaces provide two axially spaced circumferential locations of initial engagement with a work piece.

3. The holder of claim 1 wherein the body includes radial slits located to facilitate spline deflection.

4. The holder of claim 3 wherein the relieved surfaces extend less than the length of the slits.

5. The holder of claim 3 wherein said slits are employed in involute spline roots fewer than the number of spline teeth.

6. The holder of claim 3 wherein said slits are employed in involute spline roots equal to the number of spline teeth.

7. The holder of claim 3 wherein the holder is an involute spline arbor.

8. The holder of claim 3 wherein the body is an involute spline chuck.

9. The holder of claim 3 wherein the body includes slits extending through at least some of the spline teeth.

10. The holder of claim 9 wherein the body is a square spline arbor.

11. The holder of claim 9 wherein the body is a square spline chuck.

12. A workpiece holder comprising an annular body having a radially slitted deflectable tubular work piece engageable portion, a plastic tube extending adjacent and beyond either end of said portion radially actuable hydraulically to deflect said portion radially into work piece engagement, an annular hydraulic chamber for pressurized actuating fluid adjacent one wall of said tube, either end of said tube being beveled to provide a conical shoulder, an annular seal engaging said shoulder, a corner seat for said seal having a leak passage blocked thereby otherwise communicating with said pressurized actuating fluid, said conical shoulder being adapted to additionally pressurize said seal into sealing engagement with said corner seat in response to hydraulically actuated deflection of said tube.

13. A workpiece holding arbor as set forth in claim 12 wherein said tube is hydraulically actuated to expand radially outwardly and said conical shoulder responsively exerts radially inward compression on said seal.

14. A workpiece holding chuck as set forth in claim 12 wherein said tube is hydraulically actuated to contract radially inwardly and said conical shoulder responsively exerts radially outward compression on said seal.

15. The holder of claim 12 wherein said conical shoulder extends at an angle within the range of 30° to 60° to a radial plane.

16. The holder of claim 12 wherein said conical shoulder extends at an angle of approximately 45° to a radial plane.

* * * * *